United States Patent [19]

Wise

[11] 4,409,343

[45] Oct. 11, 1983

[54] ADHESION OF RUBBER TO GLASS FIBERS

[75] Inventor: Richard M. Wise, Uniontown, Ohio

[73] Assignee: The General Tire & Rubber Company, Akron, Ohio

[21] Appl. No.: 400,805

[22] Filed: Jul. 22, 1982

Related U.S. Application Data

[60] Division of Ser. No. 331,549, Dec. 17, 1981, Pat. No. 4,355,131, which is a continuation-in-part of Ser. No. 228,844, Jan. 26, 1981, abandoned.

[51] Int. Cl.$^3$ .............................................. C08L 61/10
[52] U.S. Cl. .................................. 523/206; 523/209; 523/217; 524/504; 525/73
[58] Field of Search ....................... 523/206, 209, 217; 524/504, 494; 428/378

[56] References Cited

U.S. PATENT DOCUMENTS

| | | | |
|---|---|---|---|
| 2,817,616 | 12/1957 | Wolfe | 154/52 |
| 3,985,703 | 10/1976 | Ferry et al. | 525/902 |
| 4,251,409 | 2/1981 | Neubert | 260/29.3 |
| 4,277,384 | 7/1981 | Arkens | 525/902 |

FOREIGN PATENT DOCUMENTS

| | | |
|---|---|---|
| 778102 | 7/1957 | United Kingdom . |
| 2042563 | 9/1980 | United Kingdom . |

OTHER PUBLICATIONS

Kovac, "Tire Technology," The Goodyear Tire Rubber Company, Third Edition, 1970, pp. 61-63.
"Encyclopedia of Polymer Science and Technology", vol. 5, 1966, John Wiley & Sons, Inc., p. 433.

*Primary Examiner*—Theodore E. Pertilla

[57] ABSTRACT

An aqueous alkaline dispersion of a rubbery graft or over polymerized copolymer of a diene and a vinyl pyridine on a polyacrylate seed (core or substrate), said acrylate polymer having a Tg of not above about $-20°$ C., desirably also containing a polybutadiene, and a water soluble, heat reactable phenolic resin, in certain amounts is useful in forming an adhesive for bonding glass fiber reinforcing elements or cords to rubber compounds or stocks. After dipping the glass fiber cord in the one-step adhesive dip, the coated cord is heated to dry it and heat cure or heat set the adhesive on the cord. Thereafter, the adhesive containing glass fiber cord is combined or laminated (calendered) with a curable rubber compound and the resulting assembly is cured to form a composite in which the glass fiber cord is bonded to the rubber by means of said adhesive.

6 Claims, No Drawings

ADHESION OF RUBBER TO GLASS FIBERS

This is a division of application Ser. No. 06/331,549 filed Dec. 17, 1981, now U.S. Pat. No. 4,355,131, which is a continuation-in-part of U.S. Pat. application Ser. No. /228,844 filed Jan. 26, 1981, now abandoned.

This invention relates to the adhesion of rubber to glass fibers using a composition of a graft polymer or overpolymer of a rubbery vinyl pyridine copolymer on a polyacrylate seed polymer, desirably with a polybutadiene, and a phenolic resin.

OBJECTS

An object of the invention is to provide a composite of a glass fiber reinforcing element adhesively bonded to a rubber compound, e.g., glass fiber tire cords adhesively bonded to provide carcass plies and belt plies for making tires. Another object is to provide glass fiber reinforcing elements, e.g., such as those used in the belt and the carcass plies of tires, with a minor amount of an adhesive so that the adhesive containing elements may subsequently be bonded to rubber on curing. A further object is to provide a method for bonding glass fibers, particularly glass fiber textiles, fibers, cords, yarns and so forth, to rubber compounds using a single dip. A still further object is to provide a glass fiber or cord adhesive dip composition. Yet another object is to provide a rubbery over- or graft copolymer of a vinyl pyridine copolymer (shell) on a polyacrylate seed (core) which is useful in making glass tire cord adhesives. These and other objects and advantages of the present invention will become more apparent to those skilled in the art from the following detailed description and working examples.

SUMMARY OF THE INVENTION

According to the present invention it has been discovered that a composition comprising an aqueous alkaline dispersion of a rubbery graft or overpolymerized copolymer of a shell of a rubbery diene-vinyl pyridine copolymer on a seed or core of an acrylate polymer, said acrylate polymer having a Tg of not above about $-20°$ C., desirably also containing polybutadiene, and a heat reactable water soluble phenolic-aldehyde resin, in certain amounts, is very useful as a treating, dipping or coating material for use in bonding glass fiber reinforcing elements to rubber compounds. Sufficient alkaline material such as aqueous KOH, NaOH or $NH_4OH$ may be added to the dispersion (or to one or more of the ingredients of the dispersion before mixing them together) to obtain the desired pH, prevent coagulation of the latex and to provide for stabilization. This will vary with the pH of the resin and the latex, all of which may vary from batch to batch. Since the amount of each compound may vary, the amount of alkaline material required can also vary. After drying the adhesive on the glass fiber reinforcing element to remove water and to heat cure or heat set the adhesive on the element, the adhesive containing element can then be combined or calendered with a curable rubber compound and the resulting assembly cured, usually in a mold, to provide a laminate exhibiting good adhesive properties at ambient and elevated temperatures.

Glass cords coated with the graft copolymer containing adhesive exhibit improved breaking characteristics at low temperatures. The use of the graft copolymer may reduce the breakage which may be experienced in glass cords such as in belts in tires during normal operation at cold or low temperatures.

The present method involves only one dipping step, and the process or method can be varied to provide the desired pick-up or solids on the cord by varying the concentration of the dip or the speed of the cord through the dip to give the amount needed to develop the requisite adhesive bond. Thus, while the cord can be run through successive dips of the same or varying amounts of the above materials to get the desired buildup, this is unnecessary as satisfactory results generally can be accomplished in one dip.

DISCUSSION OF DETAILS AND PREFERRED EMBODIMENTS

The glass fiber reinforcing element or cord comprises a plurality of substantially continuous and parallel glass fibers or monofilaments. The reinforcing element or fibers contain little or no twist. In other words, twist is not intentionally applied to the element or fibers; the only twist, if any, in the element or fibers is that occasioned on passing through the glass fiber processing apparatus and on packaging or winding up the cord to form a bobbin or spool. However, in a continuous process, the elements can proceed directly from the glass processing apparatus, can be dipped in the aqueous adhesive cord dip, dried, and given a twist of about 1.5 turns per inch thereafter. The elements then are woven into tire fabric having about one quite small pick thread or element, nylon or polyester, which may be a monofilament, per inch and calendered with a rubber ply or skim stock. The glass fiber reinforced ply stock is then ready to be used in the manufacture of a tire or for other purposes.

Glass compositions useful in making the fibers for the reinforcing element or glass tire cord are well known to the art. One type of glass that may be used is a glass known as E glass and described in "Mechanics of Pneumatic Tires," Clark, National Bureau of Standards Monograph 122, U.S. Dept. of Commerce, issued November, 1971, pages 241–243, 290, and 291. The number of glass filaments or fibers employed in the glass fiber reinforcing element or cord can vary considerably depending on the ultimate use or service requirements. Likewise, the number of strands of glass fibers used to make a glass fiber reinforcing element or cord can vary widely. In general, the number of filaments in the glass fiber reinforcing element or cord for a passenger car tire can vary from about 500 to 3,000 and the number of strands in the reinforcing element can vary from 1 to 10, preferably the number of strands is from 1 to 7 and the total number of filaments about 2,000. In this connection reference is made to Wolf, "Rubber Journal," February, 1971, pages 26 and 27 and U.S. Pat. No. 3,433,689.

Shortly after the glass fibers are formed they are usually sized (by spraying or dipping and so forth and air drying) with a very small amount or fractional amount by weight of a material which acts as a protective coating during processing and handling of the glass fibers in forming the strands or reinforcing elements and during packaging. During the subsequent dipping in the aqueous adhesive tire cord dip, it is believed that the size is not removed. Materials for use as sizes for glass fibers are well known to the art. It is preferred to use a silane as a size, especially a silane which has groups which can bond or coordinate chemically or physically with at least parts of the surface of the glass of the glass fiber and with at least one or more of the components of the glass fiber aqueous adhesive cord dip. A very useful size to employ on the glass fibers is gamma-amino-propyl triethoxy silane, or similar aminoalkyl alkoxy silanes, which, when applied to the glass fibers, hydrolyzes and polymerizes to form a poly(aminosiloxane) in which a portion of the polymer is attached to the glass and another portion contains amine groups (having active hydrogen atoms) for reaction with components of the cord dip such as the phenolic resin, the polybutadiene compound or the graft vinyl pyridine copolymer compound. Chrome complexes having functional groups, also, can be used. Glass fiber sizing compounds are known, and some compositions are shown in U.S. Pat. Nos. 3,252,278; 3,287,204 and 3,538,974.

The water soluble thermosetting (heat reactable) phenolic-aldehyde resin is made by reacting an aldehyde with a phenolic compound. The preferred aldehyde to use is formaldehyde, but acetaldehyde and furfural, also may be used. In place of formaldehyde one may use paraformaldehyde or other formaldehyde donors such as hexamethylenetetramine and so forth. Also, it is preferred to start with formalin, usually a 37% solution of formaldehyde in water, which is easier to use. Mixtures of aldehydes can be used. The phenolic compound can be phenol itself, resorcinol (preferred), the cresols, the xylenols, p-tert butylphenol or p-phenyl phenol or mixture thereof. The reactants are reacted in water usually in the presence of a catalyst. One may start with a thermoplastic resin by reacting less than a molar amount of the aldehyde with the phenolic compound to form a condensation product and then may add sufficient aldehyde at the time the dip is formulated to convert the product to a thermosetting or infusible resin on heating. Alternatively, one may react a molar excess of the aldehyde with the phenolic compound to form a thermosetting type condensation product on heating and which should be used promptly. However, the alternative reaction is somewhat longer. In any event, the final product on heating is a thermoset phenolic-aldehyde resin. Alkaline material is generally added before use. Information on the preparation of the water soluble thermosetting phenolic-aldehyde resins will be found in "Encyclopedia of Chemical Technology," Kirk-Othmer, Volume 15, Second Edition, 1968, Interscience Publishers Division of John Wiley & Sons, Inc., New York, pages 176 to 208; "Technology of Adhesives," Delmonte, Reinhold Publishing Corp., New York, N.Y., 1947, pages 22 to 52; "Formaldehyde," Walker, A.C.S. Monograph Series, Reinhold Publishing Corp., New York, N.Y., Third Edition, 1964, pages 304 to 344; and "The Chemistry of Phenolic Resins," Martin, John Wiley & Sons, Inc., New York, 1956.

The rubbery graft copolymer or overpolymerized copolymer comprises a seed or core of an acrylate polymer and a shell of a vinyl pyridine polymer. The copolymer is made by first forming a seed latex of an acrylate polymer by polymerizing an acrylate monomer by free radical aqueous emulsion polymerization to at least 85% conversion and preferably to completion. Thereafter, there is added to the seed acrylate polymer latex a conjugated diene monomer and a vinyl pyridine monomer and additional water, free radical initiator, modifier if desired, and emulsifier or surfactant and so forth, and the polymerization is continued preferably to completion to form the graft or overpolymerized copolymer of the diene and vinyl pyridine on the seed acrylate polymer to provide the graft copolymer. It is felt that grafting is a suitable way for describing the overall copolymerization process.

The acrylate monomer to be used to form the seed acrylate polymer is a monomer which will form an acrylate polymer having a glass transition (Tg) temperature of not above about $-20°$ C. Examples of such monomers are ethyl acrylate, n-propyl acrylate, n-butyl acrylate, hexyl acrylate, octyl acrylate, 2-ethyl hexyl acrylate, decyl acrylate, methoxy ethyl acrylate, ethoxy ethyl acrylate, methoxy propyl acrylate and ethoxy propyl acrylate and the like. These monomers, thus, have the general formula $CH_2=CH-COOR$ where R is an alkyl group of 2 to 10 carbon atoms or a $-R'OR''$ group where $R'$ is an alkylene group of 2 to 3 carbon atoms and $R''$ is an alkyl group of 1 to 2 carbon atoms. It will be noted that poly(n-butyl acrylate) has a Tg of $-55°$ C. and poly(2-ethyl hexyl acrylate) has a Tg of $-77°$ C. (DSC). Also, there may be used as the acrylate monomer, monomers having the formula $H_2C=C(CH_3)COOR'''$ where $R'''$ is an alkyl group of 8 to 18 carbon atoms such as n-octyl methacrylate, n-dodecyl methacrylate, hexadecyl methacrylate and n-octadecyl methacrylate and the like. Poly (n-octyl methacrylate) has a Tg of $-20°$ C. and poly(n-octadecyl methacrylate) has a Tg of $-100°$ C. Mixtures of these acrylate monomers may be used to make the seed polymer latex. Of these acrylate monomers it is preferred to use n-butyl acrylate or 2-ethyl hexyl acrylate and mixture thereof.

The diene monomer used to make the shell of the graft copolymer is a conjugated diene having from 4 to 6 carbon atoms such as butadiene-1,3, isoprene, 2,3-dimethyl butadiene-1,3, or piperylene. Mixtures of these monomers may be used. It is preferred to employ butadiene-1,3. The vinyl pyridine monomer to copolymerize with the diene monomer to make the shell of the graft copolymer has from 7 to 9 carbon atoms and can be 2-vinyl pyridine, 3-vinyl pyridine, 4-vinyl pyridine, 2-methyl-5-vinyl pyridine, 2,4-dimethyl-6-vinyl pyridine and 5-ethyl-2-vinyl pyridine or mixture of the same. Of these vinyl pyridines, it is preferred to employ 2-vinyl pyridine.

Butadiene-vinyl pyridine copolymers are well known as shown by U.S. Pat. Nos. 2,561,215; 2,615,826 and 3,437,122 and British Pat. No. 595,290.

In the final rubbery graft copolymer of the present invention on a dry weight basis there are from about 8 to 20% by weight of the acrylate monomer, from 3 to 20% by weight of the vinyl pyridine monomer and from 60 to 89% by weight of the diene monomer, preferably there are from about 10 to 15% by weight of acrylate monomer, from 7 to 15% by weight of the the vinyl pyridine monomer and from 70 to 83% by weight of the diene monomer.

Aqueous alkaline latices of rubbery polybutadienes made by free radical aqueous emulsion polymerization of butadiene-1,3 are known. The polybutadiene should have a glass transition temperature, Tg, of not above about $-70°$ C.

On a dry weight basis the % by weight ratio of the butadiene-vinyl pyridine-acrylate graft copolymer to the polybutadiene is from about 20:80 to 60:40, preferably about 40% of the acrylate graft copolymer and 60% of polybutadiene.

The latex of the graft copolymer and the latex of the polybutadiene can readily be blended or mixed together.

Very minor amounts by weight of other copolymerizable monomers optionally additionally may be copolymerized with the acrylate of the seed polymer (preferred), with the butadiene and vinyl pyridine of the shell copolymer or with the butadiene of the polybutadiene so long as the useful properties and Tgs of these polymers for use as glass cord adhesives are not adversely affected. Examples of such monomers are styrene, acrylonitrile, vinyl acetate, methylmethacrylate, methyl acrylate, methacrylamide, butadiene-1,3, isoprene, piperylene, 2,3-dimethyl butadiene-1,3, ethylene glycol diacrylate, ethylene glycol dimethacrylate, divinyl benzene (preferred), trimethylol propane trimethacrylate, trimethylol propane triacrylate, 1,3-butylene glycol diacrylate, triallyl cyanurate and the like and mixtures thereof. The polyunsaturated monomers may afford some crosslinking if desired to control the flow at elevated temperatures of one or more of the dry polymers or copolymers or of the seed or shell of the graft copolymer. The crosslinking polyunsaturated monomer is preferably used or copolymerized with said acrylate monomer of the core or seed and in an amount of from about 0.05 to 1.5 parts by weight per 100 parts by weight of said acrylate monomer.

Polymerization of the monomers is effected by free-radical initiators (free-radical formers or free-radical forming systems, catalysts) such as ammonium, potassium or sodium persulfate, $H_2O_2$ and the like in an amount sufficient for polymerization of the monomers and to obtain the desired molecular weight. Other free-radical initiators can be used which decompose or become active at the temperature used during polymerization. Examples of some other free-radical initiators are cumene hydroperoxide, dibenzoyl peroxide, diacetyl peroxide, didecanoyl peroxide, di-t-butyl peroxide, dilauroyl peroxide, bis (p-methoxybenzoyl) peroxide, t-butyl peroxy pivalate, dicumyl peroxide, isopropyl percarbonate, di-sec-butyl peroxydicarbonate, azobis-dimethyl-valeronitrile, 2,2'-azobisisobutyronitrile, 2,2'-azobis-2-methylbutyronitrile and 2,2'-azobis (methylisobutyrate) and the like and mixtures of the same. Only minor amounts of initiators are necessary to effect polymerization.

Emulsifiers such as soaps, surfactants or dispersing agents are used in an amount sufficient to obtain an aqueous emulsion of the water and monomers and resulting polymers. Examples of some emulsifiers are potassium laurate, potassium soap of disproportionated rosin, potassium stearate, potassium oleate, sodium lauryl sulfate, sodium dodecyl sulfonate, sodium decyl sulfate, sodium salt of condensed naphthalene sulfonic acid and sodium rosinate and the like and mixtures thereof. Other well known surfactants can be used.

Chain transfer agents or modifiers are well known in the emulsion copolymerization of vinyl and diene monomers to make polymers. They are used generally to modify the molecular weight and to reduce cross-linking. While many types have been proposed, it is preferred to use the alkyl and/or aralkyl mercaptans having from 8 to 18 carbon atoms. Of these, the tertiary alkyl mercaptans are much preferred. Examples of some mercaptans are n-octyl mercaptan, n-dodecyl mercaptan, t-octyl mercaptan, t-dodecyl mercaptan, p-tridecyl mercaptan, tetradecyl mercaptan, hexadecyl mercaptan and so forth and mixtures thereof. If little or no mercaptan is used and polymerization is continued to completion, gel may occur and the molecular weight can be very high or infinite although some low molecular weight fractions may be found.

NaOH, KOH, $NH_4OH$ and so forth may be added to the polymerization reactor before, during or after polymerization to control the pH as desired. Polymerization may be conducted under acidic conditions, and after polymerization, the latex may be converted to the alkaline side.

The water should be free of deleterious materials, and preferably should be distilled or ion exchanged. Sufficient water is used to enable formation of the emulsions and to enable proper mixing or stirring of the ingredients during polymerization to obtain the desired rate and degree of polymerization, heat transfer and so forth. The solids content of the resulting aqueous alkaline latices or dispersions, graft copolymer and/or polybutadiene, thus, may vary from about 25 to 60% by weight, and the pH can be from about 7.0 to 11.5.

Stabilizers, antioxidants and chelating agents may be used during polymerization. Also the use of shortstops at the end of free radical polymerization is well known; they are not only used to stop the polymerization in the reactor at the desired conversion but also to prevent further polymerization, cross-linking etc., during stripping, work-up and so forth. Examples of some shortstops are hydroquinone, sodium sulfide, hydroxyl ammonium acid sulfate, hydroxyl ammonium sulfate, sodium diethyl dithiocarbamate, diethylhydroxylamine, sodium dimethyl dithiocarbamate, potassium dimethyl dithiocarbamate, dimethylammonium dimethyldithiocarbamate, hydroxylamine sulfate plus sodium hydrosulfite and so forth.

Temperatures used during polymerization should be sufficient to effect polymerization by activation of the initiator and double bonds of the monomers. They should not be too high to cause a run-away reaction and not too low to retard polymerization. In general, the temperature may be from about 2° to 90° C. If even lower temperatures are used, it may be desirable to add an inert anti-freeze material to the polymerization media.

Polymerization should preferably be conducted in a closed reactor, such as a pressure reactor, fitted with a stirrer or other agitating means, heating and cooling means, with means to flush with or pump in an inert gas such as nitrogen, helium, argon, neon and the like in order to polymerize preferably under inert or non-reactive conditions, with means to charge the monomers, water, initiators and so forth, venting means, and with means to recover the polymer and so forth. The reactor should be cleaned or flushed out between polymerization runs to remove traces of shortstops, initiators, modifier, residues and so forth which might interfere with subsequent polymerizations. There should be sufficient agitation or stirring of the polymerization media to ensure thorough mixing, diffusion, contact and so forth. All of the polymerizatioon ingredients except the shortstop may be charged to the reactor at the same time, intermittently, incrementally or continuously. Also, the ingredients may be added separately or in a mixture.

The rubbery polymers are, thus, made in water using free radical initiators, chelating agents, modifiers, emulsifiers, surfactants, stabilizers, short stopping agents and so forth by known techniques. They may be hot or cold polymerized, and polymerization may or may not be carried to about 100% conversion. If polymerization is carried out with appropriate amounts of chain transfer agents or modifiers and conversions are stopped below 100% conversion, low or no gel polymers are possible. Free radical aqueous emulsion polymerization and materials for the same are well known as shown by:
(1) Whitby et al, "Synthetic Rubber," John Wiley & Sons, Inc., New York, 1954;
(2) Schildknecht, "Vinyl and Related Polymers," John Wiley & Sons, Inc., New York, 1952;
(3) "Encyclopedia of Polymer Science and Technology," Interscience Publishers a division of John Wiley & Sons, Inc., New York, Vol. 3 (1965), Vol. 5 (1966), Vol. 7 (1967) and Vol. 9 (1968);
(4) "Materials, Compounding Ingredients and Machinery for Rubber," Publ. by "Rubber World," Bill Communications Inc., New York, 1977; and
(5) Bovey et al, "Emulsion Polymerization," Interscience Publishers, Inc., New York, 1955.

The gel content of the rubbery graft copolymer is determined by taking a sample of the particular latex involved, coagulating the rubber and separating the rubber from the water, milling the rubber obtained, dissolving the rubber in toluene and filtering the mixture to determine the gel content. See Whitby et al supra.

A method of aqueous free radical emulsion polymerization to high conversions to obtain rubbery polymers like rubbery vinyl pyridine copolymers, rubbery polybutadienes and rubbery butadiene copolymers having little or no gel is fully disclosed in U.S. Pat. No. 4,145,494 granted Mar. 20, 1979, and entitled "Aqueous Free Radical Emulsion Polymerization."

The technique of polymerizing or copolymerizing one or more monomers in the presence of a polymer or a substrate, "grafting technique," is known and is frequently called graft polymerization or graft copolymerization. In this connection, please see "Proceedings Of The Third Rubber Technology Congress," 1954, W. Heffer & Sons, Ltd., Cambridge, pages 185-195; "Copolymerization," High Polymers, Vol. XVIII, Ham, Pages 323-324, 335-420 and 573, Interscience Publishers a division of John Wiley & Sons, New York, 1964; "Block and Graft Polymers," Burlant and Hoffman, Reinhold Publishing Corporation, New York, 1960; "Block and Graft Copolymers," Ceresa, Butterworth & Co. (Publishers) Ltd., London, 1962; and "Graft Copolymers," Polymer Reviews, Vol. 16, Battaerd and Tregear, Interscience Publishers, a division of John Wiley & Sons, New York, 1967. The graft copolymer shell may contain all graft copolymer but also may be a mixture of homopolymers, copolymers as well as the graft itself. Thus, if the conversion of the seed or core is not complete, then when the Bd and VP are charged, the shell may contain some acrylate homopolymer, Bd homopolymer, Bd-acrylate, Bd-VP and Bd-VP-acrylate copolymers and so forth as well as the graft. However, what is generally believed is that the VP (vinyl pyridine) moieties are on the outside of the latex particles where the adhesive effect is obtained and the acrylate is on the inside.

The pH of the latex and of the dip should be on the alkaline side and the pH of any surfactants and stabilizers, including freeze-thaw stabilizers and other additives should be on the alkaline side or compatible or be neutral to avoid improper coagulation of the latex or latices.

Water is used in the adhesive in an amount sufficient to provide for the desired dispersion of the rubber or latex particles, and for the solution of the phenolic resin and any other additives, to obtain the desired viscosities, and for the proper solids content to get the necessary pickup of solids on and penetration between the fibers of the cord. The amount of water in the adhesive cord dip generally may vary so as to provide a solids content of from about 30 to 50%, preferably from about 35 to 45%, by weight. Too much water may require redipping or use of excess heat to evaporate the water on drying. Too little water may cause uneven penetration or too slow coating speeds.

In addition to the surfactants or wetting agents, and any antioxidants already in the latex, additional surfactants and antioxidants may be added to the dip in minor amounts. Also, other anti-degradants may be added as well as wax. An example of a useful wax is a wax emulsion, a blend of paraffin and microcrystalline waxes in water.

On a dry weight basis the phenolic-aldehyde resin is used in an amount of about 3 to 15, preferably from about 4 to 10, parts by weight per 100 parts by weight of rubbery graft copolymer or total of said graft copolymer and said polybutadiene in the adhesive composition.

To apply the latex adhesive to the glass fiber cords in a reliable manner, the cords are fed through the adhesive dip bath while being maintained under a small predetermined tension and into a drying oven when they are dried under a small predetermined tension (to prevent sagging without any appreciable stretching). As the cords leave the oven they enter a cooling zone where they are air cooled before the tension is released. In each case the adhesive-coated cords leaving the dip are dried in the oven at from about 200° to 600° F. (93.3° to 315.6° C.) for from about 300 to 5 seconds. The time the cord remains in the adhesive is about a few seconds or more or at least for a period of time sufficient to allow wetting of the cord and at least substantial total impregnation of the fibers of the cord. The dipping of the cords and the drying or curing of the adhesive treated glass fiber cords may be accomplished in one or more dip tanks and in one or more ovens at different times and temperatures.

The single-cord H-pull, H-adhesion, test is employed to determine the static adhesion of the dried (heat set or cured) adhesive coated glass fiber cords to rubber. In each case the rubber test specimens are made from a vulcanizable rubber composition comprising rubber, reinforcing carbon black and the customary compounding and curing ingredients. In every case the cords to be tested are placed in parallel positions in a multiple-strand mold of the type described in the single-cord H-pull adhesion test ASTM designated D 2138-72, the mold is filled with the unvulcanized rubber composition, the cords being maintained under a tension of 50 grams each, and the rubber is cured. Each rubber test specimen is ¼ inch thick and has a 3/8 inch cord embedment. After the rubber has been cured, the hot cured rubber piece is removed from the mold, cooled and H-test specimens are cut from said piece, each specimen consisting of a single cord encased in rubber and having each end embedded in the center of a rubber tab or embedment having a length of around 1 inch or so. The specimens are then aged at least 16 hours at room temperature. The force required to separate the cord from the rubber is then determined at room temperature or 250° F. (121° C.) using an INSTRON tester provided with specimen grips. The maximum force in pounds required to separate the cord from the rubber is the H-adhesion value. All the data submitted in the working examples which follow are based upon identical test conditions, and all of the test specimens were prepared and tested in the same way generally in accordance with ASTM Designation: D 2138-72.

The flexibility of single yarns dipped and dried with the adhesive of this invention was determined by the MIT test (as described in TAPPI Standard Method T423 m-50 for the folding endurance of paper) in which the sample is flexed at three cycles per second through a total arc of 270° until the sample breaks. The number of flexes to failure is recorded as a direct measure of the low temperature endurance of the yarn. The temperature of flexing can be varied from about −40° C. to about +130° C. Two variations of the test are:

Method A—a single processed yarn is flexed under 500 grams tension.

Method B—a single processed yarn embedded in rubber is flexed under one kilogram tension; the sample being approximately 6" long, 3/16" wide, and 0.030" thick.

Glass cords or fabric coated with the adhesive of the present invention using the one-step or single dip of this invention can have from about 10 to 40%, preferably from about 15 to 25%, by weight (dry) solids of the adhesive dip on the cord based on the weight of the cord and can be used in the manufacture of carcasses, belts, flippers and chafers of radial, bias, or belted-bias passenger tires, truck tires, motorcycle tires, off-the-road tires and airplane tires, and, also, in making transmission belts, V-belts, conveyor belts, hose, gaskets, tarpaulins and the like.

While the adhesive containing glass fiber reinforcing element can be adhered to vulcanizable natural rubber and rubbery butadiene-styrene copolymer or blend thereof by curing the same in combination together, it is apparent that the heat cured adhesive containing glass fiber reinforcing element can be adhered to other vulcanizable rubbery materials, by curing or vulcanizing the same in combination with the rubber, such as one or more of the foregoing rubbers as well as nitrile rubbers, chloroprene rubbers, polyisoprenes, polybutadienes, acrylic rubbers, isoprene-acrylonitrile rubbers and the like and mixtures of the same. These rubbers can be mixed with the usual compounding ingredients including sulfur, stearic acid, zinc oxide, magnesium oxide, silica, carbon black, accelerators, antioxidants, antidegradants and other curatives, rubber compounding ingredients and the like well known to those skilled in the art for the particular rubbers being employed. Also, the adhesive dip of the present invention may also be used to adhere cords, yarns and the like of other natural and synthetic fibers to rubber compounds.

The following examples will serve to illustrate the present invention with more particularity to those skilled in the art. In these examples the parts are parts by weight unless otherwise indicated.

EXAMPLE I

The latex preparations described below are carried to completion in nitrogen flushed polymerization bottles in a water bath with agitation.

| 1. Preparation of poly (BA) seed latex | Parts By Weight | |
|---|---|---|
| | Dry | Wet |
| n-Butyl acrylate | 200 | 200 |
| Water | — | 280 |
| SIPEX UB (30% in water) | 9.0 | 30.0 |
| Potassium persulfate | 0.6 | 0.6 |
| Total | 209.6 | 510.6 |

The polymerization temperature was 50° C. Latex converted to alkaline side.

| 2. Preparation of polystyrene seed latex | Parts By Weight | |
|---|---|---|
| | Dry | Wet |
| Styrene | 200 | 200 |
| Water | — | 256.6 |
| DRESINATE 214 (20% in water) | 8.0 | 40.0 |
| Potassium persulfate | 0.5 | 0.5 |
| SULFOLE 120 | 0.5 | 0.5 |
| Total | 209.0 | 497.6 |

The polymerization temperature was 50° C. Alkaline latex as produced.

| 3. Preparation of 70/15/15 Bd/BA/VP terpolymer latex | Parts By Weight | |
|---|---|---|
| | Dry | Wet |
| Butadiene-1,3 | 140 | 140 |
| n-Butyl acrylate | 30 | 30 |
| 2-Vinylpyridine | 30 | 30 |
| Water | — | 255 |
| SIPEX UB (30% in water) | 4.0 | 13.34 |
| Potassium persulfate | 0.6 | 0.6 |
| SULFOLE 120 | 0.4 | 0.4 |
| Total | 205.0 | 469.34 |

The polymerization temperature was 60° C. Alkaline latex as produced.

| 4. Preparation of 70/15 Bd/VP copolymer latex | Parts By Weight | |
|---|---|---|
| | Dry | Wet |
| Butadiene-1,3 | 140 | 140 |
| 2-Vinylpyridine | 30 | 30 |
| Water | — | 231.4 |
| SIPEX UB (30% in water) | 5.1 | 17.0 |
| Potassium persulfate | 0.51 | 0.51 |
| Sodium carbonate | 0.26 | 0.26 |
| SULFOLE 120 | 0.34 | 0.34 |
| Total | 176.21 | 419.51 |

The polymerization temperature was 50° C. Alkaline latex as produced.

| 5. Preparation of a 70/15/15 Bd/VP/BA graft latex from 15 parts poly (BA) seed | Parts By Weight | |
|---|---|---|
| | Dry | Wet |
| Butadiene-1,3 | 140 | 140 |
| 2-Vinylpyridine | 30 | 30 |
| Poly (BA) latex (from Run 1. above) | 30 | 74.81 |
| Water | — | 210.74 |
| SIPEX UB (30% in water) | 6 | 20.00 |
| Potassium persulfate | 0.6 | 0.6 |

| 5. Preparation of a 70/15/15 Bd/VP/BA graft latex from 15 parts poly (BA) seed | | |
|---|---|---|
| | Parts By Weight | |
| | Dry | Wet |
| SULFOLE 120 | Variable* | — |

*Between 0.4–1.6 parts

The polymerization temperature was 60° C. Alkaline latex as produced.

| 6. Preparation of a 70/15/15 Bd/VP/St graft latex from 15 parts polystyrene seed | | |
|---|---|---|
| | Parts By Weight | |
| | Dry | Wet |
| Butadiene-1,3 | 140 | 140 |
| 2-Vinylpyridine | 30 | 30 |
| Polystyrene latex (from Run 2. above) | 30 | 71.94 |
| Water | — | 203.96 |
| DRESINATE 214 (20% in water) | 6.0 | 30.0 |
| Potassium persulfate | 0.6 | 0.6 |
| SULFOLE 120 | 1.2 | 1.2 |
| Total | 207.8 | 477.7 |

The polymerizaton temperature was 50° C. Alkaline latex as produced.

EXAMPLE II

Preparation of Adhesive Dips for Cord Processing

The aqueous cord adhesive dips were prepared by mixing a resorcinol-formaldehyde (RF) resin with the desired latex such that there were 7.5 dry parts RF resin per 100 parts by weight latex solids with a total solids content of 40%. The 7.5 parts dry RF resin is composed of 6.82 dry parts neutralized PENACOLITE R-2170 (RF resin)+0.68 dry parts formaldehyde. An example is shown below.

| | Parts | |
|---|---|---|
| | Dry | Wet |
| Latex (41% solids in water) | 59.53 | 145.19 |
| PENACOLITE R-2170 (40.0% solids in water, neutralized) | 4.06 | 10.15 |
| Formaldehyde (37% in water) | 0.41 | 1.11 |
| Water | — | 3.55 |
| Total | 64.00 | 160.00 |

The glass yarn (1/0 ECH 15 sized glass yarn from Owens-Corning Fiberglass Corporation) was immersed in the cord dip to impregnate and coat the cord or yarn and passed through a heated oven. The entrance temperature was 163° C., the exit temperature was 219° C., and the passage time was 45 seconds. The desired dip pickup was approximately 20% by weight on the cord. Recipe for the rubber compound used for the determination of H-adhesion of the glass yarns to rubber is shown below. The rubber compound containing the dried adhesive coated glass yarns was cured at 152° C. for 20 minutes.

| Rubber Compound | |
|---|---|
| Ingredient | Parts by Weight |
| Smoked Sheet (natural rubber) | 50 |
| SBR-1502 | 50 |
| ENDOR | 0.15 |
| HAF carbon black | 35 |
| Zinc oxide | 3 |
| Stearic acid | 1 |
| PICCO 100 | 2 |
| Styrenated phenol (antioxidant) | 1 |
| ASTM 103 oil (plasticizer) | 7 |
| Diphenyl guanidine | 0.15 |
| NOBS #1 (vulcanization accelerator) | 0.9 |
| Sulfur | 2.6 |

EXAMPLE III

Table I, below, compares the H-adhesives of dried adhesive coated glass yarns cured in the rubber using 70/15/15 overall compositions of Bd/VP/BA and Bd/VP/St each made in three different ways: (a) graft latex, (b) blend and (c) terpolymer.

TABLE I

H-Adhesion of the Glass Yarns in 70/15/15 Overall Compositions Of Bd/VP/BA and Bd/VP/St Latex Dips Prepared In Three Different Ways[1]

| Varied Monomer | Type of Latex | ASTM-D-2138-72 H-Adhesion in Rubber Compound (Newtons) | |
|---|---|---|---|
| | | ca 25° C. | 121° C. |
| n-butyl acrylate | Graft (poly (BA) seed + Bd and VP monomers, Run 5 above) | 147 | 93 |
| | Blend (15 poly (BA) + 70/15 BD/VP copolymer, Runs 1 and 4, above) | 151 | 93 |
| | Terpolymer (the three monomers added together, Run 3, above) | 138 | 98 |
| styrene | Graft (polystyrene seed + Bd and VP monomers, Run 6 above) | 182 | 116 |
| | Blend (15 polystyrene + 70/15 Bd/VP copolymer, Runs 2 and 4, above) | 44 | 18 |
| | Terpolymer[2] (the three monomers added together) | 156 | 102 |

[1]All of the dips contained 7.5 parts of the RF resin per 100 parts by weight latex solids.
[2]A 70/15/15 Bd/VP/St aqueous, free radical emulsion polymerized latex having the following typical properties: Brookfield Viscosity, cps: 30; pH: 10.7; Mooney Viscosity, ML-4 @ 100° C.: 40; Surface Tension, dynes/cm: 48.

The blend with polystyrene, that shows the poor adhesion, produced a very brittle yarn at ambient temperature whereas the other two yarns containing styrene were flexible. The three yarns containing BA were all flexible. The latex prepared with polystyrene seed showed the highest adhesion, higher than the styrene terpolymer. The yarn containing the styrene terepolymer can be considered a control yarn because this terpolymer simulates a normal VP latex used in tire cord adhesives. The three yarns containing BA show equivalent results and are considered as good as the yarn containing the styrene terpolymer.

EXAMPLE IV

Table II, below, compares the flex properties of the glass yarns using 70/15/15 overall compositions of Bd/VP/BA and Bd/VP/St each made in three different ways as described above. The yarns contained the dried adhesive dip only; they were not embedded in the rubber compound (Method A).

TABLE II

Flex Properties of Glass Yarns Processed in 70/15/15 Overall Compositions of Bd/VP/BA and Bd/VP/St Latices Prepared In Three Different Ways[1]

| Varied Monomer | Type of Latex | Number of Flexes by MIT Test Method A[2] | | |
|---|---|---|---|---|
| | | −30° C. | 25° C. | 120° C. |
| n-butyl acrylate | Graft [poly (BA) seed + Bd and VP monomers, Run 5, above][3] | 8683 | 2341 | 2973 |
| | Blend [15 poly (BA) + 70/15 Bd/VP copolymer, Runs 1 and 4, above] | 2365 | 1271 | 1560 |
| | Terpolymer (the three monomers added together, Run 3) | 4883 | 1071 | 1178 |
| styrene | Graft (polystyrene seed + Bd and VP monomers, Run 6, above) | 5197 | 950 | 1579 |
| | Blend (15 polystyrene + 70/15 Bd/VP copolymer, Runs 2 and 4, above) | 388 | 202 | 1273 |
| | Terpolymer[4] (the three monomers added together) | 1385 | 995 | 1237 |

[1]All of the dips contained 7.5 parts of the RF resin per 100 parts by weight of latex solids.
[2]Processed yarn not embedded in rubber.
[3]0.2 parts Sulfole 120/100 parts latex monomers was used.
[4]A 70/15/15 Bd/St/VP aqueous, free radical emulsion polymerized latex having the following typical properties: Brookfield Viscosity, cps: 30; pH: 10.7; Mooney Viscosity, ML-4 @ 100° C.: 40; Surface Tension, dynes/cm: 48.

The latex prepared with poly(BA) seed shows the best flexing at all three temperatures. The latex prepared with polystyrene seed shows much better flexing at −30° C. than the terpolymer latex containing styrene, but is not as good as the latex prepared from poly(BA) seed. The brittle yarn produced by the polystyrene blend accounts for its poor flexing at −30° C. and 25° C.

EXAMPLE V

Table III below shows the flex properties and H-adhesions of the dry adhesive coated glass yarns using the graft copolymer latices of this invention that were prepared on a five-gallon scale. Blends of these latices with 60 parts of a poly(Bd) latex were made. These latices and latex blends are then compared with a Bd/VP/St control.

The two 60/40 blends of poly Bd/graft copolymer latex containing poly(BA) seed show much better flexing at −30° C. than the blend using a 70/15/15 Bd/VP/St latex. The 70/15/15 Bd/VP/St terpolymer latex alone shows poor low temperature flexing. The 80/10/10 graft compositions showed a little lower adhesion than the 70/15/15 graft compositions.

TABLE III

Flex Properties and H-Adhesion of Glass Yarns Processed In Adhesion Dip Containing Poly (BA) Seed Prepared On A Five-Gallon Scale

| Overall Graft Bd/VP/BA Latex Composition Made With Poly (BA) Seed[1] | Latex In Final Dip[2] | Number of Flexes at −30° C. by MIT Test (Method B)[3] | ASTM D-2138-72 H-Adhesion In the Rubber Compound (Newtons) | |
|---|---|---|---|---|
| | | | ca 25° C. | 121° C. |
| 70/15/15* | All graft copolymer | 12,724 | 151 | 93 |
| 70/15/15* | Blend. 60/40 poly Bd[4]/above graft copolymer*, dry wt. basis | 40,814 | 116 | 80 |
| 80/10/10# | All graft copolymer | 42,128 | 125 | 85 |
| 80/10/10# | Blend. 60/40 poly Bd[4]/above graft copolymer#, dry wt. basis | 55,811 | 89 | 58 |
| 70/15/15 Bd/St/VP terpolymer[5] (control) | All VP type (control) | 1,359 | 138 | 85 |
| 70/15/15 Bd/St/VP terpolymer[5] | Blend. 60/40 poly Bd[4]/VP (control) | 21,416 | 111 | 80 |

TABLE III-continued

Flex Properties and H-Adhesion of Glass Yarns Processed In
Adhesion Dip Containing Poly (BA) Seed Prepared On A
Five-Gallon Scale

| Overall Graft Bd/VP/BA Latex Composition Made With Poly (BA) Seed[1] | Latex In Final Dip[2] | Number of Flexes at −30° C. by MIT Test (Method B)[3] | ASTM D-2138-72 H-Adhesion In the Rubber Compound (Newtons) | |
|---|---|---|---|---|
| | | | ca 25° C. | 121° C. |
| (control) | | | | |

[1] Bd and VP monomers polymerized in presence of poly (BA) seed latex. 0.6 parts Sulfole 120/100 parts of latex monomers was used.
[2] All of the final dips contained 7.5 parts of the RF resin per 100 parts by weight latex solids.
[3] Yarn samples embedded in skin of rubber and cured.
[4] An aqueous, free radical, emulsion polymerized poly (Bd) latex having the following properties: Brookfield Viscosity, cps: 100-250; pH: 10-11; Surface Tension, dynes/cm: 53-62; particle size: 1500 Å; total solids content: 51-53%.
[5] A 70/15/15 Bd/St/VP aqueous, free radical, emulsion polymerized latex having the following properties: Brookfield Viscosity, cps: 44.5; pH: 10.3; Mooney Viscosity, ML-4 @ 100° C.: 66; Surface Tension, dynes/cm: 40.
*Tg of about −70° C. and #Tg of about −75° C., both determined by Differential Thermal Analysis.

EXAMPLE VI

A number of additional seed based latices were prepared and evaluated in glass tire cord adhesives. The latex variables included the type of seed, amount of crosslinking agent in the preparation of seed and the amount of mercaptan used in the final graft stage. The seed latices were prepared in a manner similar to Item 1 in above Example I except for the addition of DVB (divinyl benzene) in the cases shown. The final graft latices were prepared in a manner similar to Item 5 in Example I above except for the addition of 0.4 part potassium carbonate to increase the polymerization rate of the VP. The overall Bd/VP/EHA or BA (2-ethyl hexyl acrylate or n-butyl acrylate) graft latex composition in each case was 70/15/15. These latices are compared with a Bd/VP/St terpolymer control in blends with 60 parts poly(Bd) latex.

The sample for testing breakage was a composite simulating a tire section consisting of two polyester plies (polyester cord layers already calendered with rubber), two glass belts, and a rubber layer, the composite having a thickness of approximately 1 cm. The glass belts were made by first twisting the dip processed glass yarns (same as in Example 2, above) into 3/0 cords (1.5 turns per inch) and then drum winding the cords onto a 25 mil thick rubber sheet at 16 ends per inch to form the belts. The polyester rubber layers, glass rubber layers and the rubber layer on top were combined and cured. The 2"×7" (5.1 cm×17.8 cm) test piece was subjected to an oscillation of 0.7" (1.78 cm) compression and 0.2" (0.51 cm) tension at two cycles per second for a total of 30,000 cycles at ambient temperature (20°-25° C.). The rubber was then buffed off so that the top glass belt could be examined for breakage.

Recipe for the rubber compound used for the determination of this glass breakage in this test is shown below. The rubber composite was cured at 149° C. for 45 minutes.

The rubber compound used for H-adhesion testing is the same as that described in Example II, above.

| Rubber Compound For Glass Breakage | |
|---|---|
| Ingredient | Parts by Weight |
| Natural rubber | 46.50 |
| PEPTON 76 (peptizer) | 0.13 |
| SBR-1551 | 38.50 |
| Cis-polybutadiene | 15.00 |
| FEF carbon black | 45.00 |
| Hi-Sil 210 | 15.00 |
| AGERITE SUPERFLEX | 2.67 |
| Aromatic oil | 5.00 |
| Zinc oxide | 3.00 |
| Stearic acid | 1.50 |
| COHEDUR RL | 4.70 |
| TBBS | 1.20 |
| CRYSTEX | 3.00 |

Series A

Table IV, below, shows the breakage properties and H-adhesions of the adhesive coated glass cords using the graft copolymer latexes of this invention in which the seed polymer was from 2-ethylhexyl acrylate. Except for one case (highest DVB in the seed and lowest amount of mercaptan in the graft copolymer) the breakage was low and not significantly affected by the variation of DVB and mercaptan. In general, the seed latexes gave significantly lower breakage than the conventional Bd/VP/St terpolymer latex.

Series B

Table V, below, shows the breakage properties and H-adhesions of the adhesive coated glass cords using the graft copolymer latexes of this invention in which the seed polymer was from n-butyl acrylate (BA). The breakage was low in all cases using this seed polymer, the amount of DVB in the seed and the amount of mercaptan in the graft copolymer preparation having little effect on the breakage. In all cases the seed based latexes gave significantly lower breakage than the conventional Bd/VP/St terpolymer latex.

The breakage characteristics of glass cords containing the seed based latexes of this invention compared very favorably with those of the commercial cords. Six production control samples tested at ambient temperature (20°-25° C.) over a period of serveral months showed an average of 8.7 breaks.

TABLE IV

BREAKAGE PROPERTIES AND H-ADHESION OF GLASS CORDS[1] IN ADHESIVE DIPS[2] CONTAINING POLY (EHA) SEED; 60/40 LATEX BLEND POLY (Bd)/GRAFT COPOLYMER (Series A)

| Parts by Weight[5] DVB in Preparation of Seed Latex | Parts by Weight[6] Mercaptan in Preparation of Graft Latex[3] | ASTM D-2138-72 H-Adhesion in Rubber Compound (Newtons) Ca. 25° C. | 121° C. | Number of Breaks in Composite at Ambient Temp.[8] |
|---|---|---|---|---|
| 0.7 | 1.1 | 94 | 68 | 2.25 |
| 0.1 | 1.1 | 97 | 71 | 1.25 |
| 0 | 1.1 | 120 | 81 | 2.00 |
| 0.7 | 0.6 | 96 | 80 | 1.75 |
| 0.1 | 0.6 | 93 | 77 | 2.75 |
| 0 | 0.6 | 94 | 68 | 1.00 |
| 0.7 | 0.2 | 86 | 59 | 7.00 |
| 0.1 | 0.2 | 96 | 62 | 1.50 |
| 0 | 0.2 | 77 | 71 | 0.75 |
| Control terpolymer latex using styrene[4] | | 116 | 89 | 4.00 |

[1]The H-adhesions were determined in the form of yarns.
[2]All the dips contained 7.5 parts RF resin[7] per 100 parts by weight of latex solids.
[3]The overall composition of the graft latex polymers was 70/15/15 by weight Bd/VP/EHA.
[4]A 70/15/15 Bd/VP/St aqueous, free radical emulsion polymerized latex having the following typical properties: Brookfield Viscosity, cps: 30; pH: 10.7; Mooney Viscosity, ML-4 @ 100° C.: 40; Surface Tension, dynes/cm: 48.
[5]PBW based on 100 parts by weight of EHA.
[6]PBW based on 100 parts by weight of monomers used in shell.
[7]Same RF resin as in preceeding example.
[8]About 20-25° C.
The POLY (Bd) used in the blends was the same emulsion polybutadiene as used in the preceeding examples.

TABLE V

BREAKAGE PROPERTIES AND H-ADHESION OF GLASS CORDS[1] IN ADHESIVE DIPS[2] CONTAINING POLY (BA) SEED; 60/40 LATEX BLEND POLY (Bd)/GRAFT COPOLYMER (Series B)

| Parts by Weight[5] DVB in Preparation of Seed Latex | Parts by Weight[6] Mercaptan in Preparation of Graft Latex[3] | ASTM D-2138-72 H-Adhesion in Rubber Compound (Newtons) Ca. 25° C. | 121° C. | Number of Breaks in Composite at Ambient Temp.[8] |
|---|---|---|---|---|
| 0.7 | 1.1 | 94 | 74 | 1.75 |
| 0.1 | 1.1 | 103 | 78 | 2.75 |
| 0 | 1.1 | 114 | 77 | 1.75 |
| 0.7 | 0.6 | 100 | 71 | 2.25 |
| 0.1 | 0.6 | 102 | 73 | 1.00 |
| 0 | 0.6 | 92 | 67 | 1.75 |
| 0.7 | 0.2 | 94 | 76 | 0.50 |
| 0.1 | 0.2 | 78 | 64 | 1.00 |
| 0 | 0.2 | 90 | 73 | 0.50 |
| Control terpolymer latex using styrene[4] | | 116 | 89 | 4.00 |

[1]The H-adhesions were determined in the form of yarns.
[2]All the dips contained 7.5 parts RF resin[7] per 100 parts by weight of latex solids.
[3]The overall composition of the graft latex polymers was 70/15/15 by weight Bd/VP/BA.
[4]A 70/15/15 Bd/VP/St aqueous, free radical emulsion polymerized latex having the following typical properties: Brookfield Viscosity, cps: 30; pH: 10.7; Mooney Viscosity, ML-4 @ 100° C.: 40; Surface Tension, dynes/cm: 48.
[5]PBW based on 100 parts by weight of BA.
[6]PBW based on 100 parts by weight of monomers used in shell.
[7]Same RF resin as used in preceeding examples.
[8]About 20-25° C.
The POLY (Bd) used in the blends was the same emulsion polybutadiene as used in the preceeding examples.
Notes:
SIPEX UB — Sodium lauryl sulfate, American Alcolac.
DRESINATE 214 — Potassium soap of disproportionated rosin. Hercules, Inc.
SULFOLE 120 — t-dodecyl mercaptan. Phillips Petroleum, Rubber Chems Div.
TAMOL N — Sodium salt of condensed naphthalene sulfonic acid. Rohm and Haas Co.
SBR-1502 — Cold nonstaining aqueous emulsion, free-radical polymerized copolymer of butadiene-1,3 and styrene (target bound styrene of 23.5%), nominal Mooney viscosity ML 1 + 4 (212° F.) of 52.
ENDOR — Activated zinc salt of pentachlorothiophenol. Peptizer to improve processability. duPont.
PICCO — Resin tackifier. Hercules, Process Chemicals Div.
NOBS #1 — 90% N—oxydiethylene benzothiazyl-2-sulfenamide and 10% 2,2'-Dibenzothiazyl disulfide. American Cyanamid Co.
PENACOLITE R-2170 — Aqueous solution of resorcinol-formaldehyde resin or condensation product made with excess resorcinol (requiring formaldehyde to convert it to an infusible resin). Solids, % resin 75 ± 2; pH of 0.5-2.0. Viscosity, 23° C. (Brookfield) poises of 35-85. Specific gravity 23°/23° C. of 1.23-1.26. Koppers Company, Inc.
PEPTON 76 — Activated dithio-bisbenzanilide on an inert carrier. American Cyanamid Co.
SBR-1551 — Nonstaining cold aqueous free radical emulsion polymerized copolymer of butadiene-1,3 and styrene (target bound styrene of 23.5%), nominal Mooney viscosity ML 1 + 4 (212° F.) of 52.
Cis-polybutadiene-stereospecific, solution polymerized, 92-93% cis, nominal Mooney viscosity ML 1 + 4 at 100° C. of 45-47.
Hi-Sil 210 — Precipitated hydrated amorphous silica. PPG Industries.
AgeRite Superflex — Diphenylamine-acetone reaction product. R. T. Vanderbilt.
COHEDUR RL — A mixture of resorcinol and COHEDUR A, which is the hexa or pentamethyl ether of hexamethylol melamine, with a small amount of dibutyl phthalate plasticizer for viscosity control. Naftone, Inc.
TBBS — N—tert-Butylbenzothiazole-2-sulfenamide. American Cyanamid Co.
CRYSTEX — Insoluble sulfur with 20% oil. Stauffer Chemical.
BA — n-butyl acrylate.
Bd — butadiene-1,3.
VP — 2-vinyl pyridine.
St — styrene.
EHA — 2-ethyl hexyl acrylate
DVB — divinyl benzene (commercial DVB is about 55% pure; the working examples parts by weight are based on 100% DVB (the commercial product being adjusted for impurities).

I claim:

1. A glass fiber reinforcing element containing from about 10 to 40% by weight (dry) based on the weight of said element of a heat cured adhesive composition useful for adhering said element to a rubber compound and comprising (a) 100 parts by weight of a rubbery graft copolymer of a seed of (1) a polymer of an acrylate monomer, said polymer having a glass transition temperature of not above about −20° C., said polymer optionally additionally containing copolymerized with said acrylate monomer a very minor amount by weight of a crosslinking polyunsaturated monomer, and a shell of (2) a copolymer of a vinyl pyridine monomer having from 7 to 9 carbon atoms and a conjugated diene monomer having from 4 to 6 carbon atoms, wherein in said graft copolymer the total amount of said monomers forming said graft copolymer is from about 8 to 20% by weight of said acrylate monomer, from 3 to 20% by weight of said vinyl pyridine monomer and from 60 to 89% by weight of said conjugated diene monomer and (b) from about 3 to 15 parts by weight of a water soluble thermosetting phenolic-aldehyde resin.

2. A glass fiber reinforcing element according to claim 1 wherein said element contains from about 15 to 25% by weight (dry) of said adhesive composition, wherein in said graft copolymer the total amount of said monomers forming said graft copolymer is from about 10 to 15% by weight of said acrylate monomer, from 7 to 15% by weight of said vinyl pyridine monomer and from 70 to 83% by weight of said conjugated diene monomer, said optional crosslinking polyunsaturated monomer being used in an amount of from about 0.05 to 1.5 parts by weight per 100 parts by weight of said acrylate monomer, and where said phenolic-aldehyde resin is used in an amount of from about 4 to 10 parts by weight.

3. A glass fiber reinforcing element according to claim 2 in whch said acrylate monomer is selected from the group consisting of n-butyl acrylate and 2-ethyl hexyl acrylate and mixture thereof, said vinyl pyridine monomer is 2-vinyl pyridine, said conjugated diene is butadiene-1,3 and said polyunsaturated monomer is divinyl benzene, and wherein said phenolic-aldehyde resin is a resorcinol-formaldehyde resin.

4. A glass fiber reinforcing element according to claim 1 in which in said composition part of said graft copolymer has been replaced with a rubbery polybutadiene having a Tg of not above about $-70°$ C., in the % by weight ratio of said graft copolymer to the polybutadiene of from about 20:80 to 60:40.

5. A glass fiber reinforcing element according to claim 2 in which in said composition part of said graft copolymer has been replaced with a rubbery polybutadiene having a Tg of not above about $-70°$ C. in the % by weight ratio of said graft copolymer to the polybutadiene of from about 20:80 to 60:40.

6. A glass fiber reinforcing element according to claim 3 in which in said composition part of said graft copolymer has been replaced with a rubbery polybutadiene having a Tg of not above about $-70°$ C. to provide about 40% by weight of said graft copolymer and 60% of said polybutadiene.

* * * * *

UNITED STATES PATENT AND TRADEMARK OFFICE
CERTIFICATE OF CORRECTION

PATENT NO. : 4,409,343
DATED : October 11, 1983
INVENTOR(S) : Richard M. Wise

It is certified that error appears in the above-identified patent and that said Letters Patent are hereby corrected as shown below:

Column 19, line 23, which reads: "whch" should read ---which---.

Signed and Sealed this

Thirteenth Day of December 1983

[SEAL]

Attest:

GERALD J. MOSSINGHOFF

Attesting Officer

Commissioner of Patents and Trademarks